United States Patent
Hansen et al.

(10) Patent No.: US 12,297,852 B1
(45) Date of Patent: May 13, 2025

(54) SMART FASTENER SYSTEMS AND METHODS

(71) Applicant: United Services Automobile Association (USAA), San Antonio, TX (US)

(72) Inventors: Gregory David Hansen, San Antonio, TX (US); Andre Rene Buentello, San Antonio, TX (US); Jose L. Romero, Jr., San Antonio, TX (US); Nina Schuessler, San Antonio, TX (US); Galo M. Alava, Tampa, FL (US)

(73) Assignee: United Services Automobile Association (USAA), San Antonio, TX (US)

(*) Notice: Subject to any disclaimer, the term of this patent is extended or adjusted under 35 U.S.C. 154(b) by 232 days.

(21) Appl. No.: 17/550,676

(22) Filed: Dec. 14, 2021

Related U.S. Application Data

(60) Provisional application No. 63/126,945, filed on Dec. 17, 2020.

(51) Int. Cl.
   *F16B 1/00* (2006.01)
   *G01N 27/20* (2006.01)
   *G01N 27/24* (2006.01)

(52) U.S. Cl.
   CPC ............... *F16B 1/00* (2013.01); *G01N 27/20* (2013.01); *G01N 27/24* (2013.01)

(58) Field of Classification Search
   None
   See application file for complete search history.

(56) References Cited

U.S. PATENT DOCUMENTS

| | | | |
|---|---|---|---|
| 6,483,891 B1* | 11/2002 | Lazarev | A61B 6/06 378/90 |
| 7,412,898 B1* | 8/2008 | Smith | F16B 31/025 73/761 |
| 8,657,021 B1* | 2/2014 | Preta | H04Q 9/00 169/61 |
| 9,458,609 B2* | 10/2016 | Fleury, Jr. | E03B 9/16 |
| 9,483,674 B1* | 11/2016 | Fink | G06K 7/10366 |
| 9,970,782 B1* | 5/2018 | Fink | G01D 5/2497 |
| 10,938,447 B1* | 3/2021 | Sorensen | G06K 19/07777 |
| 11,858,458 B2* | 1/2024 | Goergen | G06F 21/44 |
| 2014/0260652 A1* | 9/2014 | Hsieh | G01L 5/24 73/761 |
| 2017/0016469 A1* | 1/2017 | Zhu | G06K 19/0775 |
| 2018/0223891 A1* | 8/2018 | White | G01K 1/024 |
| 2020/0293850 A1* | 9/2020 | Grove | G06K 19/07771 |
| 2023/0175537 A1* | 6/2023 | Pike | B25B 23/00 403/27 |

FOREIGN PATENT DOCUMENTS

TW 201320525 A1 * 5/2013 .............. H02J 13/00

* cited by examiner

*Primary Examiner* — K. Wong
(74) *Attorney, Agent, or Firm* — Fletcher Yoder, P.C.

(57) ABSTRACT

A smart fastener system includes a smart fastener configured to couple two components of a structure to one another, wherein the smart fastener includes one or more sensors that are configured to monitor one or more parameters. The smart fastener system also includes one or more processors configured to receive signals indicative of the one or more parameters, assess damage to the structure based on the one or more parameters, and provide a notification that indicates the damage to the structure in response to determining a presence of the damage to the structure.

20 Claims, 3 Drawing Sheets

SMART FASTENER SYSTEMS AND METHODS

CROSS-REFERENCE TO RELATED APPLICATION

The present application claims the benefit of and priority to U.S. Provisional Patent Application Ser. No. 63/126,945, titled "SMART FASTENER SYSTEMS AND METHODS," which was filed on Dec. 17, 2020, and which is herein incorporated by reference in its entirety for all purposes.

BACKGROUND

This section is intended to introduce the reader to various aspects of art that may be related to various aspects of the present disclosure, which are described and/or claimed below. This discussion is believed to be helpful in providing the reader with background information to facilitate a better understanding of the various aspects of the present disclosure. Accordingly, it should be understood that these statements are to be read in this light, and not as admissions of prior art.

Detection of property damage is generally performed through an in-person, physical inspection of a property (e.g., a real property, such as a building; a vehicle). For example, an individual may inspect damage to a home in order to assess the damage to the home and to estimate a cost to repair the damage to the home.

SUMMARY

A summary of certain embodiments disclosed herein is set forth below. It should be understood that these aspects are presented merely to provide the reader with a brief summary of these certain embodiments and that these aspects are not intended to limit the scope of this disclosure. Indeed, this disclosure may encompass a variety of aspects that may not be set forth below.

In one embodiment, a smart fastener system includes a smart fastener configured to couple two components of a structure to one another, wherein the smart fastener includes one or more sensors that are configured to monitor one or more parameters. The smart fastener system also includes one or more processors configured to receive signals indicative of the one or more parameters, assess damage to the structure based on the one or more parameters, and provide a notification that indicates the damage to the structure in response to determining a presence of the damage to the structure.

In one embodiment, a smart fastener system includes multiple smart fasteners, wherein each of the multiple smart fasteners is configured to couple two respective components of a structure to one another and includes one or more sensors that are configured to monitor one or more parameters. The smart fastener system also includes one or more processors that are configured to receive signals indicative of the one or more parameters and respective positions of each of the multiple smart fasteners, assess damage to the structure based on the one or more parameters and the respective positions of each of the multiple smart fasteners, and provide a notification that includes a map that represents respective locations of the damage to the structure.

In one embodiment, a smart fastener includes a fastener body that is configured to couple two components of a structure to one another. The smart fastener also includes one or more sensors integrated with the fastener body, wherein the one or more sensors are configured to monitor one or more parameters. The smart fastener further includes a communication component integrated with the fastener body, wherein the communication component is configured to wirelessly transmit signals indicative of the one or more parameters to a computing system that is remote from the smart fastener.

Various refinements of the features noted above may exist in relation to various aspects of the present disclosure. Further features may also be incorporated in these various aspects as well. These refinements and additional features may exist individually or in any combination. For instance, various features discussed below in relation to one or more of the illustrated embodiments may be incorporated into any of the above-described aspects of the present disclosure alone or in any combination. The brief summary presented above is intended only to familiarize the reader with certain aspects and contexts of embodiments of the present disclosure without limitation to the claimed subject matter.

BRIEF DESCRIPTION OF THE DRAWINGS

Various aspects of this disclosure may be better understood upon reading the following detailed description and upon reference to the drawings in which.

DETAILED DESCRIPTION

Figure 1:
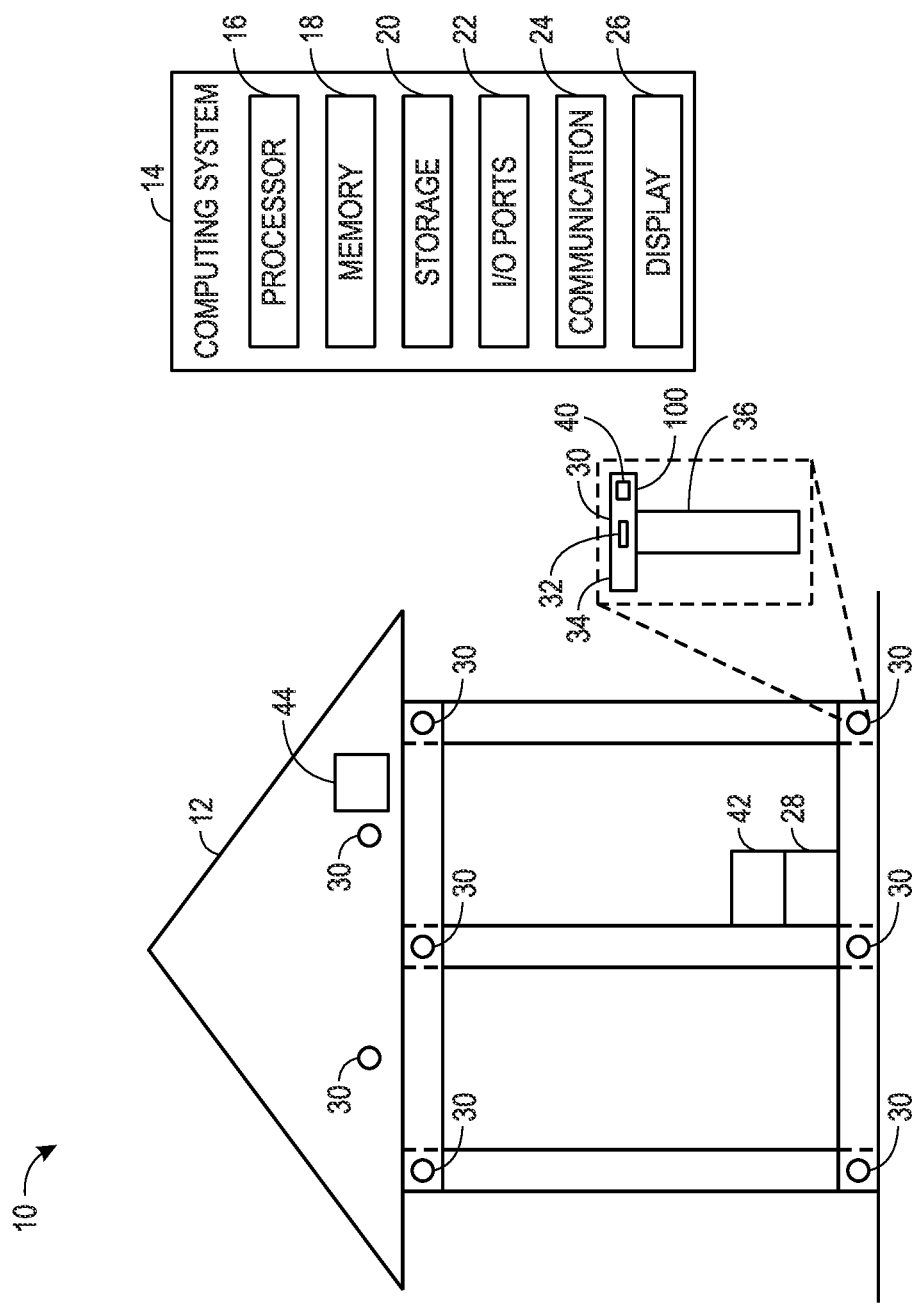
FIG. 1 illustrates a schematic diagram of a smart fastener system within a building, in accordance with embodiments described herein.

One or more specific embodiments will be described below. In an effort to provide a concise description of these embodiments, not all features of an actual implementation are described in the specification. It should be appreciated that in the development of any such actual implementation, as in any engineering or design project, numerous implementation-specific decisions must be made to achieve the developers' specific goals, such as compliance with system-related and enterprise-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

When introducing elements of various embodiments of the present disclosure, the articles "a," "an," and "the" are intended to mean that there are one or more of the elements. The terms "comprising," "including," and "having" are intended to be inclusive and mean that there may be additional elements other than the listed elements. Additionally, it should be understood that references to "one embodiment" or "an embodiment" of the present disclosure are not intended to be interpreted as excluding the existence of additional embodiments that also incorporate the recited features. As used herein, the term "computing system" refers to an electronic computing device such as, but not limited to, a single computer, virtual machine, virtual container, host, server, laptop, and/or mobile device, or to multiple electronic computing devices working together to perform the function described as being performed on or by the computing system.

As noted above, detection of property damage is generally performed through an in-person, physical inspection of a property (e.g., a real property, such as a building; a vehicle). For example, an individual may inspect damage to a home in order to assess the damage to the home and to estimate a cost to repair the damage to the home. However, the property damage may occur while the individual is not present at the property and/or the property damage may not be readily visible to the individual (e.g., a water leak may be behind a wall of the home). Thus, it is presently recognized that it would be beneficial to provide a smart fastener system that is configured to detect the property damage at the property.

The smart fastener system may include one or more smart fasteners that include one or more sensors (e.g., a fluid sensor, a temperature sensor, a pressure sensor, a chemical sensor, a position sensor) that are configured to detect one or more parameters that are indicative of the property damage at the property. The one or more smart fasteners may also be configured to provide support to the structure of the property (e.g., mechanical support by fastening two components that form the structure of the property to one another). For example, the one or more smart fasteners may include a smart fastener (e.g., a nail or a threaded fastener, such as a screw, a bolt, or a nut) that holds two wooden boards that form a frame of the building to one another, that holds a piece of drywall to a wooden board of the frame of the building, that holds a roofing shingle to a roofing sheet, or the like. Furthermore, the smart fastener may include piezoelectric material that generates electrical signals when caused to flex by pressure, tension, bending, sheering, or other forces.

The one or more sensors associated with (e.g., coupled to, integrated into, and/or encapsulated within) the one or more smart fasteners may provide signals that are indicative of the one or more parameters to a computing system. The computing system may process the signals to determine the one or more parameters, determine a presence of the property damage at the property based on the one or more parameters, and instruct appropriate action in response to the presence of the property damage at the property. The appropriate action may include providing an output that indicates the presence of the property damage at the property. For example, the output may be an audible alert and/or a visual notification to notify the user of the property damage at the property. Additionally or alternatively, the appropriate action may include adjusting the one or more smart fasteners, such as by actuating one or more actuation devices that are configured to adjust the one or more smart fasteners.

In some embodiments, the smart fastener system may be configured to generate a map that illustrates a respective position (e.g., absolute position and/or relative position) of each of the one or more smart fasteners, which may facilitate tracking changes in the respective position over time. The map may also include additional information, such as the one or more parameters measured by each of the one or more smart fasteners. Furthermore, the one or more smart fasteners may be powered via a power harvesting circuit, which may be configured to harvest power from wind, light, motion, forces applied to the smart fasteners (e.g., via movement of material engaged by the smart fasteners; mechanical strain at the smart fasteners) or other sources and to provide the power to components (e.g., the one or more sensors, communication devices, processing devices) of the one or more smart fasteners.

With the foregoing in mind, FIG. 1 illustrates a schematic diagram of a smart fastener system 10 that may be used within a building 12, in accordance with embodiments described herein. The smart fastener system 10 includes a computing system 14, which may include any suitable computer device, such as a general-purpose personal computer, a laptop computer, a tablet computer, a mobile computer, or the like. The computing system 14 may include various types of components that assist the computing system 14 in performing various operations described herein. For example, the computing system 14 may include a processor 16, a memory 18, a storage 20, input/output (I/O) ports 22, a communication device 24 (e.g., computing system communication device), and/or a display 26. In some embodiments, the smart fastener system 10 may include a hub 28 (e.g., control panel), which may be placed within the building 12 and may include some or all of the components of the computing system 14. Indeed, the hub 28 may be configured to carry out some or all of the processes described herein as being carried out by the computing system 14.

As shown, the smart fastener system 10 includes one or more smart fasteners 30, and each of the one or more smart fasteners 30 may include one or more sensors 32. The one or more smart fasteners 30 may be configured to provide support to the building 12 (e.g., mechanical support by fastening two components that form a structure of the building 12 to one another). For example, the one or more smart fasteners 30 may include a fastener (e.g., a nail or a threaded fastener, such as a screw, a bolt, or a nut) that holds two wooden boards that form a frame of the building 12 to one another.

The one or more sensors 32 may include any of a variety of types of sensors 32 that are configured to detect one or more parameters that are indicative of damage to the building 12. For example, the one or more sensors 32 may include a fluid sensor that is configured to detect fluid, a temperature sensor that is configured to detect temperature, a pressure sensor that is configured to detect pressure, a chemical sensor that is configured to detect a chemical (e.g., carbon monoxide), and/or a position sensor that is configured to detect a position. The fluid may indicate a fluid leak or inappropriate moisture level (e.g., humidity) within the building 12, the temperature sensor may indicate a fire or other inappropriate temperature within the building 12, and/or the chemical may indicate a chemical leak within the building. The position may be used to confirm a location of the damage (e.g., the location of the leak) and/or may be monitored to detect a change in the position over time that may indicate a structural change within the building. The position sensor may include any of a variety of types of position sensors, such as a global positioning system (GPS) receiver that is configured to receive signals indicative of absolute coordinates (e.g., GPS coordinates) via communication with GPS satellites, for example.

As shown in FIG. 1, at least one of the one or more smart fasteners 30 may include a first portion 34 (e.g., head portion; radially-expanded portion) and a second portion 36 (e.g., shaft portion), and the one or more sensors 32 may be positioned in the first portion 34. However, it should be appreciated that the one or more sensors 32 may be positioned in the first portion 34, the second portion 36, or both.

For example, the sensor 32 illustrated in detail in FIG. 1 may include features (e.g., piezoelectric material to detect mechanical strain) than are incorporated into an entirety of the smart fastener 30 or form various parts of the overall smart fastener 30. Furthermore, while FIG. 1 generally illustrates the smart fastener 30 having a shape like a nail or bolt, it should be appreciated that the one or more smart fasteners 30 may have a different shape or form (e.g., staple; strap).

The one or more smart fasteners 30 may include one or more additional devices 40, which may include a communication device (e.g., fastener communication device) that is configured to communicate with the communication device 24 of the computing system 14 via wired or wireless communication (e.g., over a network). For example, the communication device is configured to communicate the signals indicative of the one or more parameters from the one or more sensors 32 to the computing system 14. It should be appreciated that the signals indicative of the one or more parameters from the one or more sensors 32 may be associated with the respective smart fastener 30 and/or the position of the respective smart fastener 30 by the computing system 14.

Additionally or alternatively, the one or more additional devices 40 may include a radio-frequency identification (RFID) tag, a power harvesting circuit (e.g., internal power harvesting circuit), and/or a microcontroller. In such cases, the RFID tag may be configured to communicate with an RFID reader 42, which may be positioned within the building 12 (e.g., at the hub 28) or at any suitable location that enables the RFID reader 42 to read the RFID tag. The RFID tag may include a memory that stores a unique identification code for the RFID tag. In response to receipt of electromagnetic radiation from the RFID reader 42, the RFID tag may transmit the unique identification code to the RFID reader 42. Then, the RFID reader 42 may transmit the unique identification code to the computing system 14.

The communication between the RFID tag and the RFID reader 42 may also indicate the position of the smart fastener 30. For example, the RFID reader 42 may be configured to detect a strength of a return signal (e.g., backscatter) with the unique identification code from the RFID tag, and the computing system 14 may utilize the strength of the return signal to determine the position (e.g., approximate position) of the RFID tag, and thus, the smart fastener 30. In some embodiments, multiple RFID readers 42 may be used to determine (e.g., via triangulation) the position of the RFID tag, and thus, the smart fastener 30 more accurately based on the respective strengths of the return signals. The position may be used to confirm a location of the damage and/or may be monitored to detect a change in the position over time that may indicate a structural change within the building.

In some embodiments, where the microcontroller and the RFID tag are present in the smart fastener 30, the microcontroller may be coupled to the one or more sensors 32 and may be configured to write data indicative of the one or more parameters (e.g., based on the signals generated by the one or more sensors 32) to the memory device of the RFID tag. Then, the data indicative of the one or more parameters may be transferred from the RFID tag to the RFID reader 42 (e.g., as backscatter with the unique identification code), and the RFID reader 42 may communicate the data indicative of the one or more parameters to the computing system 14. The computing system 14 may associate the unique identification code with the one or more parameters that are indicative of the damage to the building. Because the unique identification code may also be associated with the position within the building 12 (e.g., via inputs during construction of the building 12 and/or via the RFID communications), the computing system 14 may determine a location of the damage within the building.

In some embodiments, the power harvesting circuit may be configured to harvest power from the electromagnetic radiation emitted by the RFID reader 42. The power may be provided to the one or more sensors 32 to enable the one or more sensors 32 to monitor the one or more parameters. In some embodiments, the power harvesting circuit may include an energy storage device (e.g., capacitor or battery) that is configured to store the power that is harvested from the electromagnetic radiation. In some embodiments, the microcontroller may control the delivery of the power to the one or more sensors 32 periodically (e.g., every 1, 5, 10, 15, 30, 60 minutes or more) or at other appropriate times after the power is harvested from the electromagnetic radiation. It should be appreciated that the power harvesting circuit of the smart fastener 30 may harvest power in other ways. For example, the power harvesting circuit of the smart fastener 30 may include a solar panel (e.g., photovoltaic material) that is configured to harvest power from light (e.g., solar radiation) or a power harvesting circuit configured to harness kinetic energy.

Furthermore, the smart fastener system 10 may include an external power harvesting circuit 44 that is located external to the one or more smart fasteners 30. The external power harvesting circuit 44 may be configured to harvest power and to provide the power to the one or more smart fasteners 30. For example, the external power harvesting circuit 44 may include a solar panel that is positioned on a roof or other portion of the building 12 that is exposed to light or a wind turbine that is positioned on the roof or other portion of the building 12. In such cases, the wind turbine may be used to harvest power from the wind.

The external power harvesting circuit 44 may include any other suitable type of energy converter device, such as an energy converter device that is configured to harvest power from motion, vibration, and/or temperature gradients. For example, the external power harvesting circuit 44 may include an energy converter device that is incorporated into a movable component of the building 12 (e.g., a door, a roofing shingle), and the energy converter device may be used to harvest power from motion of the movable component of the building 12. As a more specific example, the energy converter device may be incorporated into the roofing shingle (e.g., smart roofing shingle), and the energy converter device may be used to harvest power from flexing of the roofing shingle (e.g., during windy conditions). Regardless of the features of the power harvesting circuit (e.g., within the one or more smart fasteners 30 and/or the external power harvesting circuit 44), the power may be provided to enable operation of the one or more sensors 32 and/or the one or more additional devices 40 of the one or more smart fasteners 30.

The components that are used to harvest power from the wind and/or the motion of the movable component of the building 12 may enable various additional operational features for the smart fastener system 10. In some embodiments, the components may provide an indication of wind parameters (e.g., wind speed and/or direction) and/or the components may provide an indication of a condition of the movable component and/or a condition of the smart fastener 30. For example, if the movable component of the building 12 and/or the smart fastener 30 is known to move in a particular way (e.g., the roofing shingle bends to a particular degree; the smart fastener 30, such as the smart fastener 30 that holds the roofing shingle, moves its location or bends to a particular degree) in the presence of certain wind parameters, then the movement of the movable component of the building 12 and/or the movement of the smart fastener 30 may be used to derive the wind parameters (e.g., via one or more algorithms or a lookup table). As another example, if the movable component of the building 12 and/or the smart fastener 30 moves beyond a threshold or more than expected (e.g., the roofing shingle bends more than expected; the smart fastener 30, such as the smart fastener 30 that holds the roofing shingle, moves its location or bends more than expected) in response to a particular wind speed (e.g., below a threshold wind speed as measured by a wind speed sensor or obtained via a data source, such as a weather data source that is accessible to the computing system 14), the computing system 14 may determine that the condition of the movable component and/or the smart fastener 30 is impaired. Then, the computing system 14 may take an appropriate action, such as providing an output to indicate that the condition of the movable component and/or the smart fastener 30 is impaired.

The processor 16 may be any type of computer processor or microprocessor capable of executing computer-executable code. The memory 18 and the storage 20 may be any suitable articles of manufacture that can serve as media to store processor-executable code, data, or the like. These articles of manufacture may represent computer-readable media (e.g., any suitable form of memory or storage) that may store the processor-executable code used by the processor 16 to perform various techniques disclosed herein. The memory 18 and the storage 20 may represent non-transitory computer-readable media (e.g., any suitable form of memory or storage). It should be noted that non-transitory merely indicates that the media is tangible and not a signal. Data (e.g., the one or more parameters, location, thresholds) may be stored in one or more databases, which may be accessible to the computing system 14 and/or may be part of the computing system 14 (e.g., within the storage 20).

The I/O ports 22 may be interfaces that may couple to other peripheral components, such as input devices (e.g., keyboard, mouse). The display 26 may operate as a human machine interface (HMI) to depict visualizations associated with software or executable code being processed by the processor 16. In one embodiment, the display 26 may be a touch display capable of receiving inputs from a user of the computing system 14. The display 26 may be any suitable type of display, such as a liquid crystal display (LCD), plasma display, or an organic light emitting diode (OLED) display, for example. It should be noted that the components described above with regard to the computing system 14 are examples and the computing system 14 may include additional or fewer components. The computing system 14 may include a personal computer, a mobile computer, or the like that may be positioned within the building 12, form the hub 28, and/or be carried by the user. In some embodiments, the computing system 14 may be a distributed computing system that includes multiple processors (e.g., including one or more cloud computing systems having multiple processors 16).

Figure 2:
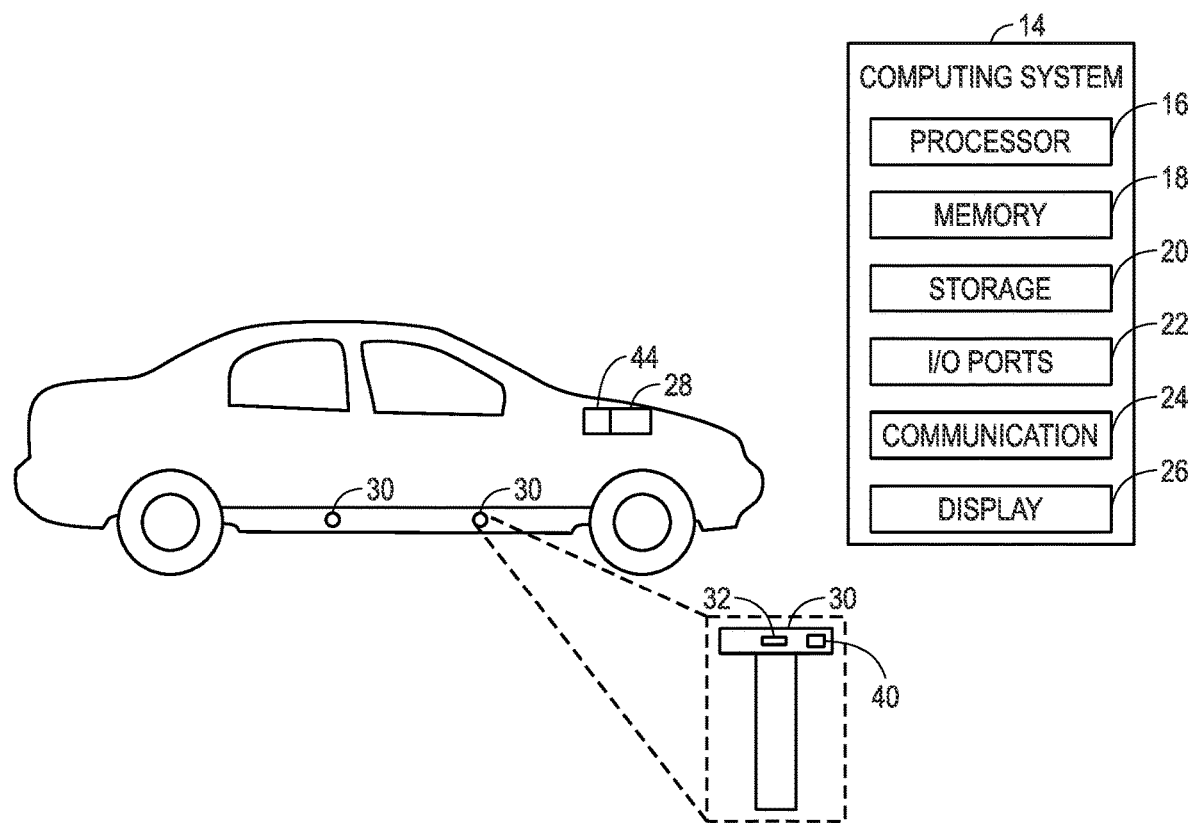
FIG. 2 illustrates a schematic diagram of the smart fastener system within a vehicle, in accordance with embodiments described herein.

FIG. 2 illustrates a schematic diagram of the smart fastener system 10 that may be used within a vehicle 50, in accordance with embodiments described herein. As shown, the smart fastener system 10 includes the computing system 14, which may include the processor 16, the memory 18, the storage 20, the I/O ports 22, the communication device 24, and/or the display 26. Some or all of the components of the computing system 14 may be part of the hub 28, which may be supported within the vehicle 50. The smart fastener system 10 includes the one or more smart fasteners 30, and each of the one or more smart fasteners 30 may include the one or more sensors 32. The one or more smart fasteners 30 may be configured to provide support to the vehicle 50 (e.g., mechanical support by fastening two components that form a structure of the vehicle 50 to one another). For example, the one or more smart fasteners 30 may include a fastener (e.g., a nail or a threaded fastener, such as a screw, a bolt, or a nut) that holds two steel members that form a frame of the vehicle 50 to one another.

The one or more sensors 32 may include any of a variety of types of sensors 32 that are configured to detect one or more parameters that are indicative of damage to the vehicle 50. For example, the one or more sensors 32 may include a fluid sensor that is configured to detect fluid, a temperature sensor that is configured to detect temperature, a pressure sensor that is configured to detect pressure, a chemical sensor that is configured to detect a chemical (e.g., carbon monoxide), and/or a position sensor that is configured to detect a position. The one or more smart fasteners 30 may include one or more additional devices 40, which may include the communication device (e.g., fastener communication device) that is configured to communicate with the communication device 24 of the computing system 14 via wired or wireless communication (e.g., over the network). The one or more additional devices 40 may include the RFID tag, the power harvesting circuit, and/or the microcontroller. The smart fastener system 10 may also include the external power harvesting circuit 44. In the vehicle 50, the external power harvesting circuit 44 may harvest power from wind, light, and/or motion (e.g., vibration of the engine).

The smart fastener system 10 may be particularly useful in the vehicle 50 to detect a change in pressure on the one or more smart fasteners 30 (e.g., above a threshold), which may indicate that the vehicle 50 has structural damage. For example, in response to detecting that the pressure is above the threshold, the smart fastener system 10 may take the appropriate action of providing an output that indicates the presence of the structural damage and/or the one or more parameters (e.g., including the location of the structural damage and/or the pressure) to the user to facilitate maintenance operations (e.g., inspection and/or repair). While FIGS. 1 and 2 illustrate the smart fastener system 10 in the context of the building 12 and the vehicle 50, respectively, it should be appreciated that the smart fastener system 10 may be utilized with any of a variety of different types of properties and/or structures, such as bridges, high-rise buildings, and the like.

Figure 3:
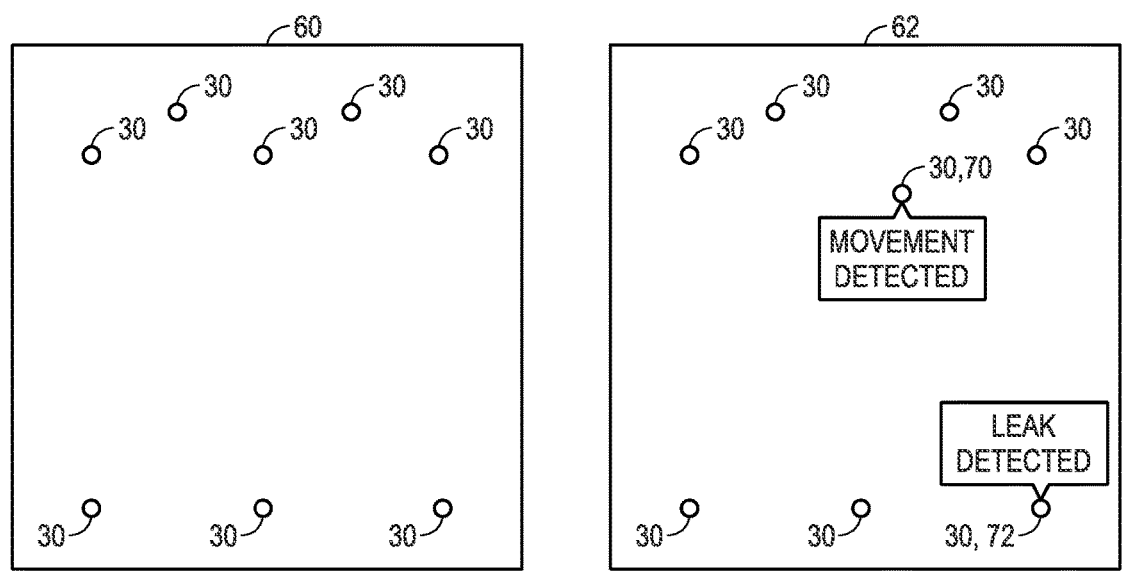
FIG. 3 illustrates smart fastener maps that may be generated via the smart fastener system, in accordance with embodiments described herein.

FIG. 3 illustrates smart fastener maps 60, 62 (e.g., matrices) that may be generated via the smart fastener system 10, in accordance with embodiments described herein. In some embodiments, the smart fastener maps 60, 62 may be overlaid on an image (e.g., photograph; drawing, such as a blueprint) of the structure (e.g., the building 12 of FIG. 1) to facilitate visualization by the user. The smart fastener map 60 may be a baseline map that indicates a respective position of each of the one or more smart fasteners 30 at a first time (e.g., immediately after construction of the structure; predefined or expected position according to a blueprint of the structure; immediately after a repair to the structure). The respective position of each of the one or more smart fasteners 30 may be input by the user upon construction of the structure (e.g., according to the blueprint of the structure) and/or may be obtained via any of the location monitoring techniques disclosed herein (e.g., using the GPS receivers and/or the RFID tags) to generate the smart fastener map 60. Then, the respective position of each of the one or more smart fasteners 30 may be monitored via any of the location monitoring techniques disclosed herein (e.g., using the GPS receivers and/or the RFID tags) over time, and the computing system 14 may utilize the respective position of each of the one or more smart fasteners 30 to generate the smart fastener map 62 that indicates a respective position of the one or more smart fasteners 30 at a second time (e.g., a current time; after the first time). In FIG. 3, the smart fastener maps 60, 62 show that one of the smart fasteners 30, 70 has moved relative to the other smart fasteners 30 over time (e.g., between the first time and the second time; from baseline).

In some embodiments, the smart fastener maps 60, 62 may be provided to the user, such as via the display 26 of the computing system 14 of FIG. 1. In such cases, additional information may be provided with the smart fastener maps 60, 62 (e.g., overlaid on to the smart fastener maps 60, 62) and/or separately from the smart fastener maps 60, 62 (e.g., as a pop-up notification or a visual notification). The additional information may include distance(s) between the smart fasteners 30, change(s) in the distance(s) between the smart fasteners 30, coordinate(s) of the smart fasteners 30, change(s) in the coordinate(s) of the smart fasteners 30, sensing capabilities of the smart fasteners 30 (e.g., a type of the one or more sensors 32 for each of the smart fasteners 30), the one or more parameters detected by the one or more sensors 32, the damage to the property based on the one or more parameters detected by the one or more sensors 32, a recommendation, and/or a prediction. For example, the smart fastener map 62 shows that a leak has been detected at one of the smart fasteners 30, 72.

In some embodiments, the computing system 14 may generate and provide the recommendation based on the position of the one or more smart fasteners 30 (e.g., the recommendation may include fixing the structure and/or re-securing the smart fastener 30 that has moved from the baseline). In some embodiments, the recommendation may be based on the damage to the property and/or the one or more parameters detected by the one or more sensors 32 (e.g., the recommendation may include fixing a source of the damage, such as patching a section of a roof in a vicinity of a leak detected by the one or more sensors 32).

The one or more parameters, the damage to the property, and/or the smart fastener maps 60, 62 may be utilized to predict additional damage to the property (e.g., a likelihood of secondary damage and/or future damage). With respect to the secondary damage, if a certain type of secondary damage (e.g., cracks in drywall) has accompanied similar damage (e.g., primary damage, such as movement of the smart fastener 30, 70) in a high percentage (e.g., 50, 75, 90, or 95 percent) of previous instances, then the computing system 14 may determine that the structure is likely to experience the type of secondary damage (e.g., with a likelihood of 50, 75, 90, or 95 percent). With respect to the future damage, if a certain type of future damage has accompanied similar damage (e.g., primary damage, such as a water leak at a particular location or movement of the smart fastener 30, 70) in a high percentage (e.g., 50, 75, 90, or 95 percent) of previous instances, then the computing system 14 may determine that the structure is likely to experience the type of future damage (e.g., with a likelihood of 50, 75, 90, or 95 percent) at a future time (e.g., within 24 hours, 1 week, 1 year). The computing system 14 may access and utilize historical data from the property and/or one or more other properties to make predictions, such as to predict the additional damage to the property (e.g., using one or more algorithms or lookup tables).

In some embodiments, the computing system 14 may also determine a rate of movement of the smart fastener 30, 70 over time. The computing system 14 may assess the rate of movement of the smart fastener 30, 70 (including whether the rate is increasing or decreasing over time) and may predict when the smart fastener 30, 70 will reach a position (s) that is associated with impairment of the structure (or that otherwise warrants maintenance operations). The computing system 14 may also assess the movement of multiple smart fasteners 30 and/or the one or more parameters measured at multiple smart fasteners 30 to predict the secondary damage and/or the future damage.

The computing system 14 may also adjust the output based on the damage and/or the predicted damage (e.g., severity). For example, if the movement is isolated to the smart fastener 30, 70 and no movement is present at nearby smart fasteners 30, the computing system 14 may take a first appropriate action (e.g., notify the user of the movement). However, if the movement includes the smart fastener 30, 70 and one or more nearby smart fasteners 30, the computing system 14 may take a second appropriate action (e.g., trigger an actuation device to adjust one or more of the smart fasteners 30). Similarly, if the leak is detected only at the smart fastener 30, 72 and not at the nearby smart fasteners 30, the computing system 14 may take a first appropriate action (e.g., notify the user of the leak). However, if the leak is detected at the smart fastener 30, 72 and at one or more nearby smart fasteners 30, the computing system 14 may take a second appropriate action (e.g., trigger shut off of a water supply to the structure).

In certain embodiments, machine learning may be used to make the predictions. As used herein, machine learning refers to algorithms and statistical models that may be used to perform a specific task without using explicit instructions, relying instead on patterns and inference. In particular, machine learning generates a mathematical model based on data (e.g., sample or training data, previous damage data) in order to make predictions or decisions without being explicitly programmed to perform the task. Thus, as data related to the property is collected, patterns of the damage may be identified and processed via machine learning to predict the secondary damage and/or the future damage.

Figure 4:
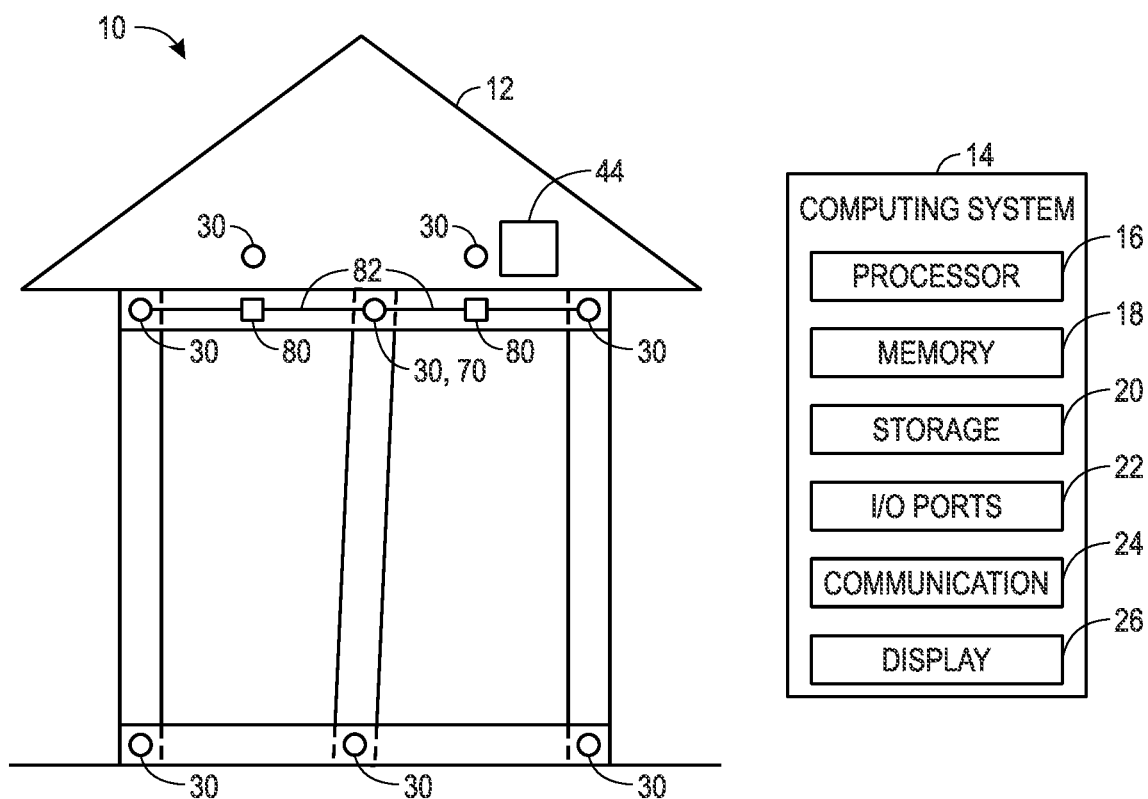
FIG. 4 illustrates the smart fastener system with actuation devices, in accordance with embodiments described herein.

FIG. 4 illustrates the smart fastener system 10 with actuation devices 80, in accordance with embodiments described herein. The actuation devices 80 may include a motor (e.g., electric motor) that may be powered via the external power harvesting circuit 44 or via another power supply. The actuation devices 80 may be coupled to at least one of the one or more smart fasteners 30, such as via linkage members 82 (e.g., rigid bars; flexible cable or netting).

In operation, the computing system 14 may monitor the position of the one or more smart fasteners 30 over time, and the computing system 14 may instruct the actuation devices 80 to adjust the linkage members 82 to thereby adjust the position of the one or more smart fasteners 30. For example, as shown in FIG. 4, one of the smart fasteners 30, 70 is in an undesirable position (e.g., not at baseline). The computing system 14 may determine that the smart fastener 30, 70 is in the undesirable position and may instruct the actuation devices 80 to adjust the linkage members 82 in a manner that drives (e.g., pulls and/or pushes) the smart fastener 30, 70 back toward a desirable position (e.g., the baseline position). For example, when the smart fastener 30, 70 has shifted in a first direction, the actuation devices 80 and the linkage members 82 may drive the smart fastener 30, 70 in a second direction that is opposite the first direction.

The actuation devices 80 may also include robotic drills or other tools that move within the structure (e.g., within the walls) to access the smart fastener 30, 70 to tighten or otherwise secure the smart fastener 30, 70 (e.g., via rotation or a driving force). Indeed, the actuation devices 80 may have any of a variety of forms and/or operational features to adjust the one or more smart fasteners 30.

Figure 5:
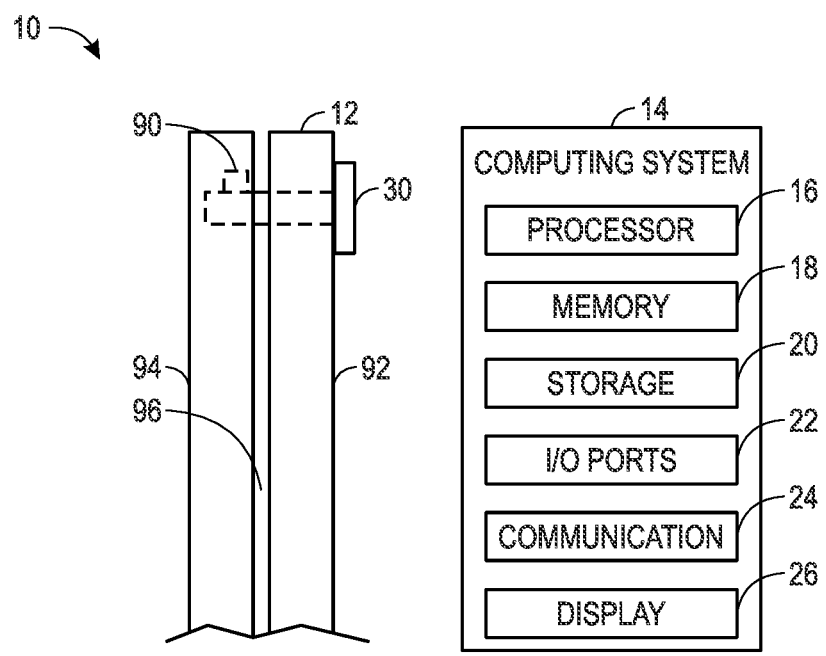
FIG. 5 illustrates the smart fastener system with an adjustable smart fastener, in accordance with embodiments described herein.

FIG. 5 illustrates a portion of the smart fastener system 10, wherein the smart fastener 30 is adjustable, in accordance with embodiments described herein. In some embodiments, the smart fastener 30 may be formed from a smart material (e.g., active material) that is configured to change in response to application of a magnetic field, an electric field, or a change in temperature. For example, the active material may be a magnetostrictive material that is configured to deform (e.g., deflect, change shape, expand, shrink, bend) in response to application of a magnetic field, the active material may be an electroactive material that is configured to deform in response to application of an electric field, the active material may be a temperature-responsive material that is configured to deform in response to application of change in temperature (e.g., application of certain temperature or heat).

In operation, the computing system 14 may monitor the one or more parameters of the one or more smart fasteners 30 over time. In response to detecting a change in position, a change in pressure, or another parameter indicative of a change in the smart fastener 30 (e.g., stretching), the computing system 14 may instruct an activating element 90 to apply a deformation-inducing effect (e.g., the magnetic field, the electric field, the change in temperature) to thereby deform the smart fastener 30 to counteract the change in the smart fastener 30. For example, in the illustrated embodiment, the activating element 90 may cause the smart fastener 30 to deform (e.g., shrink, reduce a length of the second portion) to bring a first structural component 92 and a second structural component 94 of the building 12 toward one another to reduce a gap 96 between the first structural component 92 and the second structural component 94 of the building 12. In this way, in response to the smart fastener 30 being in an undesirable position or otherwise experiencing an undesirable change, the activating element 90 may cause the smart fastener 30 to deform to resume a desirable position (e.g., the baseline position) and/or to resist further undesirable change. It should be appreciated that instead of being formed from a smart material, the smart fastener 30 may instead be deformable (e.g., retractable, bendable) via other mechanisms (e.g., mechanical drives, biasing members). The self-repairing functions may be particularly useful for framing and/or foundation, for example.

Additionally, with reference to FIG. 1, the smart fastener 30 may include a protective coating 100. The protective coating 100 may be configured cover the one or more sensors 32 during installation and may deteriorate (e.g., dissolve) after installation (e.g., over time, such as over 30 minutes, 1 hour, 24 hours, 30 days, or longer). For example, the protective coating 100 may attract moisture that dissolves the protective coating 100. In some such cases, the one or more sensors 32 may be configured to detect the dissolution and/or the absence of the protective coating 100, and the computing system 14 may use the absence of the protective coating 100 to determine that there is fluid present (e.g., a leak) at the smart fastener 30.

In some embodiments, the protective coating 100 may be configured to deteriorate (e.g., dissolve) as part of the installation process. For example, a chemical may be applied to the protective coating 100 during installation via an installation device (e.g., nail gun). However, in some embodiments, the installation device may apply the protective coating 100 prior to and/or during insertion of the smart fastener 30 into the building 12 (e.g., into the framing of the building 12). The protective coating 100 may block the one or more sensors 32 from detecting the one or more parameters while the protective coating 100 is in place on the smart fastener 30.

Advantageously, the disclosed techniques may enable more efficient and accurate identification of damage to a property (e.g., buildings, vehicles, bridges). For example, a leak through roofing shingles may be detected and analyzed the computing system, which may then provide guidance regarding the leak, predictions related to damage, and/or other actions (e.g., actuation; deformation) to reduce the damage to the property. This may save substantial time, effort and expense associated with detecting and/or repairing the damage. Moreover, the present embodiments may enable collection and organization of structural data and/or damage data in one or more databases that may be utilized for evaluation of damage and/or prediction of damage at the property.

While only certain features of disclosed embodiments have been illustrated and described herein, many modifications and changes will occur to those skilled in the art. It is, therefore, to be understood that the appended claims are intended to cover all such modifications and changes as fall within the true spirit of the present disclosure.

The techniques presented and claimed herein are referenced and applied to material objects and concrete examples of a practical nature that demonstrably improve the present technical field and, as such, are not abstract, intangible or purely theoretical. Further, if any claims appended to the end of this specification contain one or more elements designated as "means for [perform]ing [a function] . . . " or "step for [perform]ing [a function] . . . ", it is intended that such elements are to be interpreted under 35 U.S.C. 112 (f). However, for any claims containing elements designated in any other manner, it is intended that such elements are not to be interpreted under 35 U.S.C. 112 (f).

The invention claimed is:

1. A smart fastener system, comprising:
   a smart fastener configured to provide mechanical support to couple two components of a structure to one another, wherein the smart fastener comprises a smart fastener body with one or more sensors integrated within the smart fastener body, and wherein the one or more sensors are configured to monitor one or more parameters; and
   one or more processors configured to:
   receive signals indicative of the one or more parameters;
   assess damage to the structure based on the one or more parameters; and
   provide a notification that indicates the damage to the structure in response to determining a presence of the damage to the structure.

2. The smart fastener system of claim 1, wherein the one or more sensors comprise a fluid sensor, a temperature sensor, a pressure sensor, a chemical sensor, a position sensor, or any combination thereof.

3. The smart fastener system of claim 1, wherein the structure comprises a building, a vehicle, or a bridge.

4. The smart fastener system of claim 1, wherein the smart fastener comprises a radio-frequency identification (RFID) tag that is configured to provide a unique identification code to a RFID reader that is communicatively coupled to the one or more processors.

5. The smart fastener system of claim 4, wherein the smart fastener body comprises a microcontroller integrated within the smart fastener body that is configured to write data indicative of the one or more parameters to a memory device of the RFID tag, the RFID reader is configured to receive the data along with the unique identification code from the RFID tag, and the RFID reader is configured to provide the signals indicative of the one or more parameters to the one or more processors.

6. The smart fastener system of claim 5, wherein the one or more processors are configured to determine a position of the smart fastener based on a strength of a backscatter provided by the RFID tag to the RFID reader.

7. The smart fastener system of claim 1, wherein the one or more sensors comprise a global positioning system receiver, and the one or more parameters comprise a position of the smart fastener.

8. The smart fastener system of claim 1, wherein the one or more processors are configured to control an actuation device to adjust a position of the smart fastener to counteract the damage to the structure.

9. The smart fastener system of claim 1, wherein the one or more processors are configured to control an activation element to deform the smart fastener to counteract the damage to the structure.

10. The smart fastener system of claim 1, comprising:
a plurality of additional smart fasteners, wherein each of the plurality of additional smart fasteners comprises one or more respective sensors that are configured to monitor one or more respective parameters;
wherein the one or more processors are configured to:
receive additional signals indicative of the one or more respective parameters; and
generate a map that indicates respective positions of the smart fastener and the plurality of additional smart fasteners.

11. A smart fastener system, comprising:
a plurality of smart fasteners, wherein each of the plurality of smart fasteners is configured to provide mechanical support to couple two respective components of a structure to one another and comprises a respective smart fastener body with one or more sensors integrated within the respective smart fastener body, wherein the one or more sensors are configured to monitor one or more parameters; and
one or more processors configured to:
receive, from the one or more sensors, signals indicative of the one or more parameters and respective positions of each of the plurality of smart fasteners;
assess damage to the structure based on the one or more parameters and the respective positions of each of the plurality of smart fasteners; and
provide a notification that includes a map that represents respective locations of the damage to the structure.

12. The smart fastener system of claim 11, wherein the one or more sensors comprise a fluid sensor, a temperature sensor, a pressure sensor, a chemical sensor, a position sensor, or any combination thereof.

13. The smart fastener system of claim 11, wherein each of the plurality of smart fasteners comprises a respective radio-frequency identification (RFID) tag that is configured to provide a respective unique identification code to a RFID reader that is communicatively coupled to the one or more processors.

14. The smart fastener system of claim 13, wherein the each of the plurality of smart fasteners comprises a respective microcontroller that is configured to write data indicative of the one or more parameters to a respective memory device of the RFID tag, the RFID reader is configured to receive the data along with the respective unique identification code, and the RFID reader is configured to provide the signals indicative of the one or more parameters to the one or more processors.

15. The smart fastener system of claim 13, wherein the one or more processors are configured to access a database that associates the respective unique identification code with the respective position of the each of the plurality of smart fasteners in the structure.

16. The smart fastener system of claim 11, comprising a display communicatively coupled to the one or more processors, wherein the one or more processors are configured to instruct display of the notification via the display.

17. A smart fastener, comprising:
a fastener body that is configured to provide mechanical support to couple two components of a structure to one another, the fastener body comprising:
one or more sensors integrated within the fastener body, wherein the one or more sensors are configured to monitor one or more parameters; and
a communication component integrated within the fastener body, wherein the communication component is configured to wirelessly transmit signals indicative of the one or more parameters to a computing system that is remote from the smart fastener.

18. The smart fastener of claim 17, wherein the fastener body comprises a radially-expanded head portion that is configured to remain exposed outside of the two components and a shaft portion that is configured to extend through the two components to couple the two components of the structure to one another.

19. The smart fastener of claim 17, wherein the communication component comprises a radiofrequency identification (RFID) tag that is configured to transmit a unique identification code with the signals indicative of the one or more parameters.

20. The smart fastener of claim 17, wherein the fastener body comprises a piezoelectric material, and the smart fastener comprises a power harvesting circuit that is configured to harvest power from mechanical deformation of the fastener body.

* * * * *